United States Patent
Hwang et al.

(10) Patent No.: US 8,837,786 B2
(45) Date of Patent: Sep. 16, 2014

(54) FACE RECOGNITION APPARATUS AND METHOD

(75) Inventors: Won Jun Hwang, Suwon-si (KR); Kyung Shik Roh, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 207 days.

(21) Appl. No.: 13/293,459

(22) Filed: Nov. 10, 2011

(65) Prior Publication Data

US 2012/0155718 A1 Jun. 21, 2012

(30) Foreign Application Priority Data

Dec. 21, 2010 (KR) ........................ 10-2010-0131261

(51) Int. Cl.
*G06K 9/00* (2006.01)
*G06K 9/46* (2006.01)
*G06K 9/62* (2006.01)

(52) U.S. Cl.
CPC .......... *G06K 9/00288* (2013.01); *G06K 9/4619* (2013.01); *G06K 9/6234* (2013.01); *G06K 9/00281* (2013.01); *G06K 9/6297* (2013.01)
USPC .......................................... 382/118; 382/115

(58) Field of Classification Search
None
See application file for complete search history.

(56) References Cited

U.S. PATENT DOCUMENTS

| | | | | |
|---|---|---|---|---|
| 2003/0161504 A1* | 8/2003 | Inoue | ............................ | 382/115 |
| 2006/0251339 A1* | 11/2006 | Gokturk et al. | ............... | 382/305 |
| 2007/0172099 A1* | 7/2007 | Park et al. | ..................... | 382/118 |
| 2007/0239683 A1* | 10/2007 | Gallagher | ......................... | 707/3 |
| 2009/0316962 A1* | 12/2009 | Sun et al. | ...................... | 382/118 |

* cited by examiner

*Primary Examiner* — Stephen R Koziol
*Assistant Examiner* — Amandeep Saini
(74) *Attorney, Agent, or Firm* — Staas & Halsey LLP

(57) ABSTRACT

A face recognition apparatus and method. Sub-images having different face sizes are generated using a received face image of a person to be identified. Feature vectors of the sub-images are generated and observation nodes are generated based on the feature vectors. The observation nodes corresponding to the sub-images are compared with stored reference nodes of sub-images of a registered person on a face size by face size basis to calculate similarity scores between the observation nodes and the reference nodes. State nodes are generated based on the respective similarity scores of the face sizes, the observation and state nodes are compared, and the state nodes are compared to perform face recognition. This improves face recognition performance and face recognition speed. Face recognition performance robust to facial expression variation or type information is achieved by performing I-shaped curvature Gabor filtering on a plurality of sub-images based on the eye distance.

19 Claims, 12 Drawing Sheets c = {0.0}
c = {0.05}
c = {0.1}
c = {0.2}
σ={0.5π}  σ={π}  σ={2π}
(A)

c = {0.0}
c = {0.05}
c = {0.1}
c = {0.2}
σ={0.5π}  σ={π}  σ={2π}
(B)

(A)

(B)

FACE RECOGNITION APPARATUS AND METHOD

CROSS-REFERENCE TO RELATED APPLICATIONS

This application claims the benefit of Korean Patent Application No. 2010-0131261, filed on Dec. 21, 2010 in the Korean Intellectual Property Office, the disclosure of which is incorporated herein by reference.

BACKGROUND

1. Field

Embodiments relate to a face recognition apparatus and method for identity verification.

2. Description of the Related Art

Information security and identity verification is becoming increasingly important with continued advances in information technology.

Conventionally, a key, a password, an ID card, a smart card, or the like have been used for information security and identity verification. However, these are not easily portable and may be lost and may also be forged, falsified, and illegally used by others. Information security and identity verification technologies through biometrics have been developed to overcome these problems.

Biometrics recognizes a part of the bodies of an individual to verify their identity. Examples of biometrics include fingerprint recognition, iris recognition, voice recognition, signature recognition, and face recognition. Biometrics has been intensively researched since it provides great convenience and security due to use of body parts specific to each individual.

Among such biometric technologies, face recognition is regarded as a convenient and competitive biometric technology since the user's identity can be verified in a contactless manner without the need for user action, unlike other technologies such as fingerprint recognition and iris recognition which require a specific gesture or action from the user.

Face recognition technologies are being intensively developed and researched in various application fields such as summarizing of moving images using face information, which is one of the core multimedia database search technologies, identity verification, Human Computer Interface (HCI) image search, security, and monitoring system.

However, face recognition results are sensitive to changes in internal environments such as identity, age, race, face expression, and accessories and changes in external environments such as pose, external illumination, and image processing.

That is, recognition performance may vary depending on environmental changes if one specific feature analysis method is used for face recognition. Thus, there may be a need to provide a face recognition technology robust to environmental changes.

SUMMARY

Therefore, it is an aspect of an embodiment to provide a face recognition apparatus and method using a Markov network.

It is another aspect of an embodiment to provide a face recognition apparatus and method using I-shaped curvature Gabor filters.

Additional aspects of embodiments will be set forth in part in the description which follows and, in part, will be obvious from the description, or may be learned by practice of embodiments.

In accordance with an aspect of an embodiment, a face recognition apparatus includes an image input unit to receive a face image of an identity verification subject, a face image generator to generate a plurality of sub-images having different face sizes using the face image, a classification module to generate respective feature vectors of the plurality of sub-images and to generate a plurality of observation nodes based on the feature vectors, and a face recognizer to compare the observation nodes corresponding to the plurality of sub-images with stored reference nodes of sub-images of a registered person on a face size by face size basis to calculate respective similarity scores between the observation nodes and the reference nodes, generate respective state nodes based on the respective similarity scores of the face sizes, compare the observation nodes and the state nodes, and compare the state nodes to perform face recognition.

The face recognizer may perform a Markov network on the observation nodes and the state nodes.

Using each of the similarity scores of the observation nodes and the reference nodes of the face sizes, the face recognizer separately may design a probability model for a case where the similarity score is true and a probability model for a case where the similarity score is false.

Each of the state nodes may be designed using belief propagation.

The face recognizer may design a vector and a compatibility matrix for the belief propagation and apply the designed vector and compatibility matrix to the Markov network.

The face recognizer may calculate a probability value corresponding to the vector and a probability value corresponding to the compatibility matrix using the probability models, compare the probability value corresponding to the vector and the probability value corresponding to the compatibility matrix, and compare probability values between compatibility matrices to determine whether or not the identity verification subject is a registered person.

The classification module may generate a feature vector by performing I-shaped curvature Gabor filtering on each of the plurality of sub-images and generate an observation node by performing linear discriminant analysis on the feature vector.

The face image generator may detect a face and two eyes from the face image, detect a distance between the two eyes, and generate a plurality of sub-images having different face sizes by adjusting the detected distance.

In accordance with another aspect of an embodiment, a face recognition method includes generating, upon receiving a face image of an identity verification subject, a plurality of sub-images having different face sizes using the face image, generating respective feature vectors of the plurality of sub-images and generating a plurality of observation nodes based on the feature vectors, comparing the observation nodes corresponding to the plurality of sub-images with stored reference nodes of sub-images of a registered person on a face size by face size basis to calculate respective similarity scores between the observation nodes and the reference nodes, generating respective state nodes based on the respective similarity scores of the face sizes, and comparing the observation nodes and the state nodes and comparing the state nodes to perform face recognition.

Performing face recognition may include performing a Markov network on the observation nodes and the state nodes.

The face recognition method may further include separately designing, using each of the similarity scores of the observation nodes and the reference nodes of the face sizes, a probability model for a case where the similarity score is true and a probability model for a case where the similarity score is false.

Designing each of the probability models may include designing each of the state nodes and the observation nodes using belief propagation.

Designing each of the probability models may include designing a vector and a compatibility matrix for the belief propagation, and applying the designed vector and compatibility matrix to the Markov network.

Performing the face recognition may include calculating a probability value corresponding to the vector and a probability value corresponding to the compatibility matrix using the probability models, comparing the probability value corresponding to the vector and the probability value corresponding to the compatibility matrix, and comparing probability values between compatibility matrices to determine whether or not the identity verification subject is a registered person.

Generating each of the observation nodes may include generating a feature vector by performing I-shaped curvature Gabor filtering on each of the plurality of sub-images, and generating an observation node by performing linear discriminant analysis on the feature vector.

Generating the sub-images may include detecting a face and two eyes from the face image, and detecting a distance between the two eyes and generating a plurality of sub-images having different face sizes by adjusting the detected distance.

BRIEF DESCRIPTION OF THE DRAWINGS

These and/or other aspects of embodiments will become apparent and more readily appreciated from the following description of embodiments, taken in conjunction with the accompanying drawings of which.

DETAILED DESCRIPTION

Figure 1:
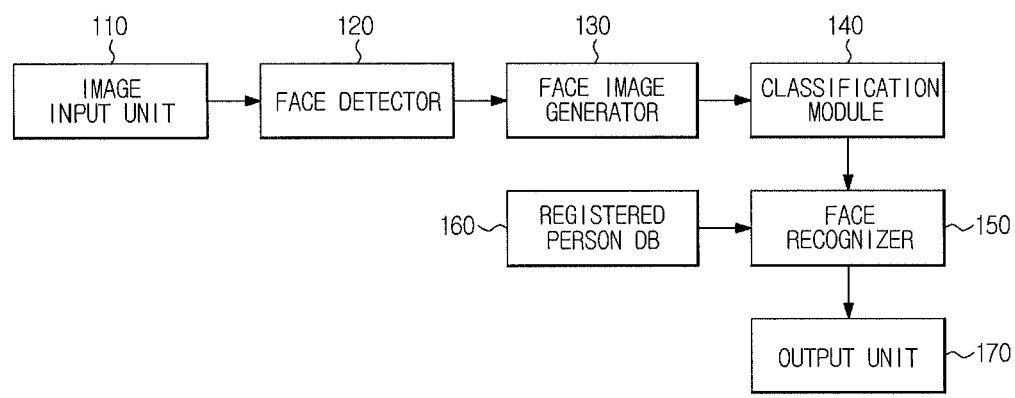
FIG. 1 illustrates a configuration of a face recognition apparatus according to an embodiment.

Reference will now be made in detail to embodiments, examples of which are illustrated in the accompanying drawings, wherein like reference numerals refer to like elements throughout.

FIG. 1 illustrates a configuration of a face recognition apparatus according to an embodiment. As shown, the face recognition apparatus includes an image input unit 110, a face detector 120, a face image generator 130, a classification module 140, a face recognizer 150, a registered person database 160, and an output unit 170.

The image input unit 110 acquires an image of a face of a person, who is a face recognition or identity verification subject, through an image capture apparatus (not shown) such as a camera or a camcorder.

The image input unit 110 acquires an image of a subject using light and includes a light focusing unit (not shown) to focus light, an image capture unit (not shown) to detect focused light and convert the detected light into an electrical signal, and an A/D converter (not shown) to convert the electrical signal into a digital signal.

The image capture unit performs functions such as exposure, gamma, gain control, white balance, and color matrix adjustment. The image capture unit may be implemented using an imaging sensor such as a Charge Coupled Device (CCD) or Complementary Metal Oxide Semiconductor (CMOS) imaging sensor.

The face detector 120 removes a background region from an input image received from the image input unit 110, detects a specific element of the face, detects a first face image M based on the specific element of the face, detects eyes in the detected face image, and acquires coordinates of the eyes in the first face image.

The face detector 120 filters the face image through a Gaussian low pass filter to remove noise from the face image. This face image may be normalized to 60*80 pixels with reference to the coordinates of the eyes.

Using the face image of 60×80 pixels (low resolution) may reduce the time required to extract features when performing feature node detection since the feature node detection time required for an image of 120×160 pixels (high resolution) is 2.6 times longer than the feature node detection time required for an image of 60×80 pixels (low resolution).

The face detector 120 performs preprocessing required to analyze features of the first face image.

More specifically, input images received from the image input unit 110 may have relatively low or high brightness and a single input image may have both a low brightness portion and a high brightness portion due to influence of illumination. Such influence of illumination may be an obstacle to extracting features from the first face image.

To reduce the influence of illumination, the face detector 120 performs preprocessing to analyze a brightness distribution of each pixel in the first face image to obtain a corresponding histogram and to smooth the histogram towards a brightness level having high frequency.

The face image generator 130 calculates a distance between the eyes based on the coordinates of the eyes of the first face image M and adjusts the calculated distance between the eyes to generate a plurality of second face images which are equal in size and have different ranges for feature analysis.

Here, the second face images include a first sub-image S1, a second sub-image S2, and a third sub-image S3 which are described below with reference to FIG. 2.

Figure 2:
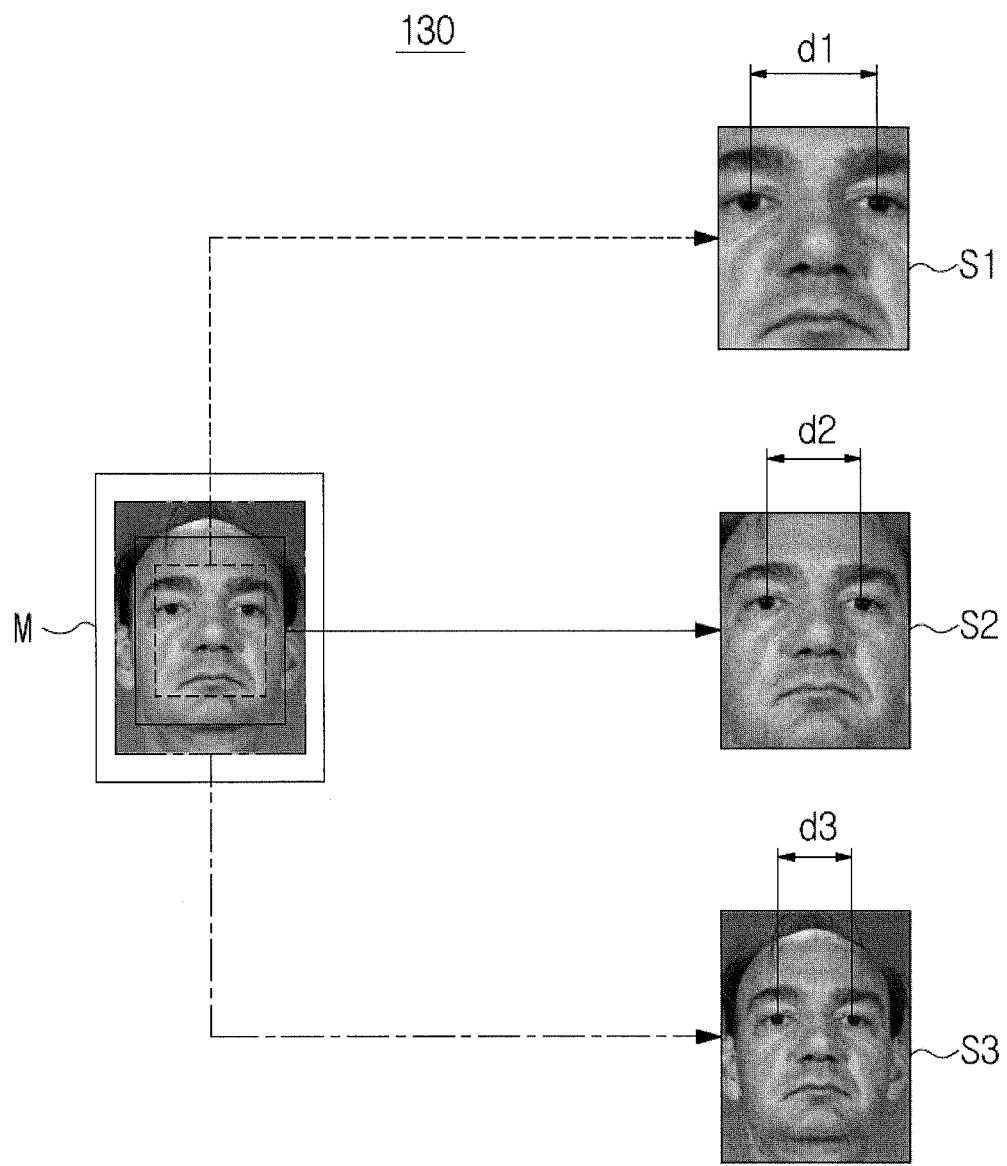
FIG. 2 illustrates exemplary sub-images of the face recognition apparatus according to an embodiment.

FIG. 2 illustrates second face images generated by the face image generator 130

As shown in FIG. 2, the face image generator 130 generates a first sub-image S1 having an eye distance of d1, a second sub-image S2 having an eye distance of d2, and a third sub-image S3 having an eye distance of d3.

The eye distances d1, d2, and d3 are previously stored and d1 is greater than d2 and d2 is greater than d3.

The first sub-image S1 is an image of an interior face model and is used to analyze features in an interior range of the face which mainly include the eyes, nose, and mouth.

The second sub-image S2 is an image of a compensated face model which is a compromise between interior and exterior face models and is used to analyze features in an interior range of the face. The second sub-image S2 may exhibit the most reliable feature analysis performance since the second sub-image S2 does not include excessive head or background information and mostly includes information of interior face components.

The third sub-image S3 is an image of the exterior face model and is used to analyze features of the face based on peripheral face components such as hair style, ears, and jaw.

The face image generator 130 generates a face image that appropriately includes overall features of the face such as eyebrows, eyes, nose, and lips while reducing influence of changes in the person's hairstyle or the background of the input image.

The classification module 140 generates a plurality of features of each of the second face images generated by the face image generator 130 by performing Linear Discriminant Analysis (LDA) on each of the second face images after curvature Gabor filtering and outputs the features of each of the sub-images. This procedure is described below with reference to FIGS. 3 to 6.

Figure 3:
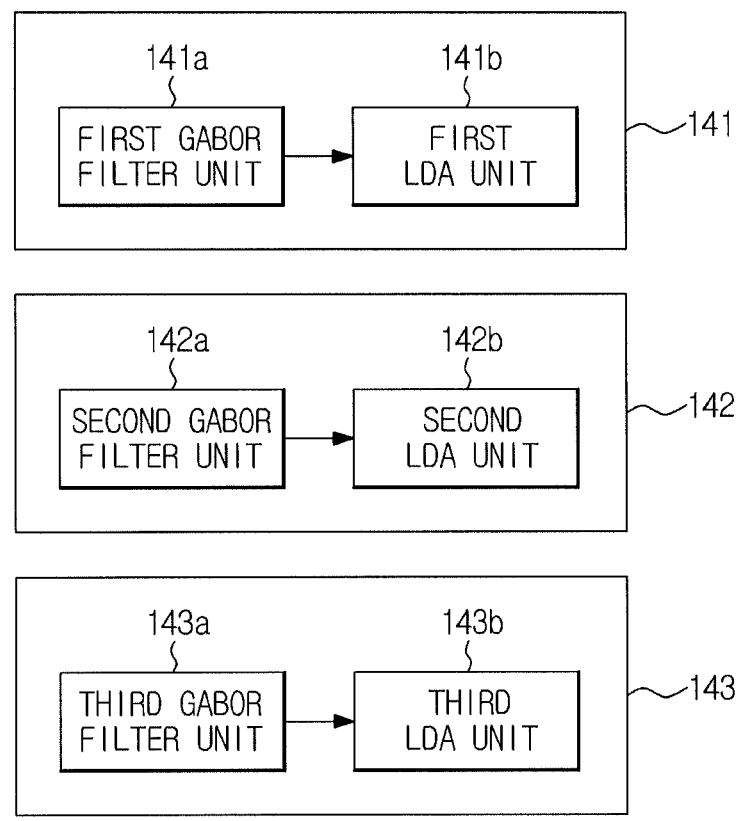
FIG. 3 illustrates a detailed configuration of a classification module provided in the face recognition apparatus according to an embodiment.

FIG. 3 illustrates a detailed configuration of the classification module 140. As shown in FIG. 3, the classification module 140 includes a first classification unit 141, a second classification unit 142, and a third classification unit 143. The classification units 141, 142, 143 include Gabor filter units 141a, 142a, and 143a and LDA units 141b, 142b, and 143b, respectively.

The classification module 140 receives the first sub-image S1, the second sub-image S2, and the third sub-image S3 generated by the face image generator 130. Specifically, the first classification unit 141 receives the first sub-image S1, the second classification unit 142 receives the second sub-image S2, and the third classification unit 143 receives the third sub-image S3 and each classification unit generates features of the received sub-image.

More specifically, the Gabor filter units 141a, 142a, and 143a generate features by projecting groups of extended curvature Gabor having different characteristics onto the corresponding sub-images.

Here, the characteristics of the extended curvature Gabor filters (or extended curvature Gabor classifiers) may be determined based on parameters of the Gabor filters and features may be grouped according to the characteristics of the Gabor filters.

More specifically, the characteristics of the extended curvature Gabor filters are determined based on parameters of the Gabor filters such as orientation ($\mu$), scale (v), Gaussian width ($\sigma$), and curvature ratios (c) and features of Gabor filters having the same orientation and features of Gabor filters having the same scale may be grouped for each combination of Gaussian widths and curvature ratios.

For example, 56 extended curvature Gabor filters having different characteristics may be obtained using 7 scales and 8 orientations. Here, 12 extended curvature Gabor filters having different characteristics may be additionally obtained using 3 Gaussian widths and 4 curvature ratios.

Accordingly, a greater number of $$1{,}176.0 \left( = \underbrace{7 \times 16 \times 3 \times 3}_{v \ \ \mu \ \ \sigma \ \ c \neq 0} + \underbrace{\underbrace{7 \times 8 \times 3}_{v \ \ \mu \ \ \sigma}}_{c=0} \right)$$

extended curvature Gabor filters than conventional (5×8=40) Gabor filters may be obtained by varying Gaussian widths and curvature ratios for each extended curvature Gabor filter and may be projected onto the corresponding sub-images to represent different features.

Thus, each of the Gabor filter units 141a, 141b, and 141c may use a smaller or greater number of extended curvature Gabor filters by adjusting the parameters (such as orientation, scale, Gaussian width, and curvature ratio) to other values.

Here, optimal extended curvature Gabor filters are found using AdaBoost. A boost learning method such as Gentle-Boost, realBoost, KLBoost, or JSBoost may also be used. Using such boosting learning, complementary Gabor features may be selected from the sub-images to improve recognition efficiency of object images.

It may be possible to reduce the amount of calculation required for face recognition since optimal features are selectively extracted using the boosting algorithm.

Each of the Gabor filter units 141a, 141b, and 141c generates features of the corresponding sub-image using I-shaped extended curvature Gabor filters. This procedure is described below with reference to FIGS. 4 and 5.

Figure 4:
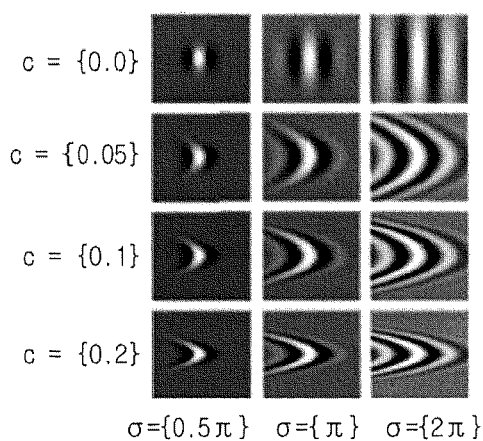
FIG. 4 illustrates an exemplary I-shaped curvature Gabor filter group according to an embodiment.
Figure 4:
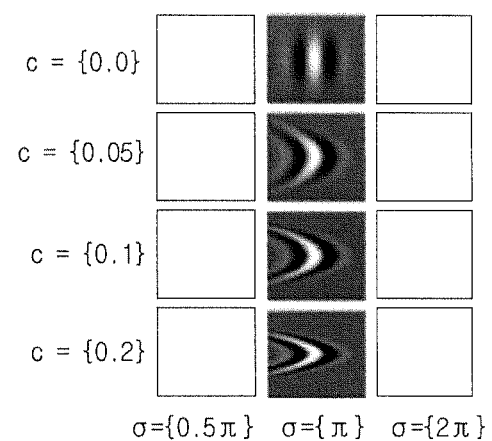
Figure 5:
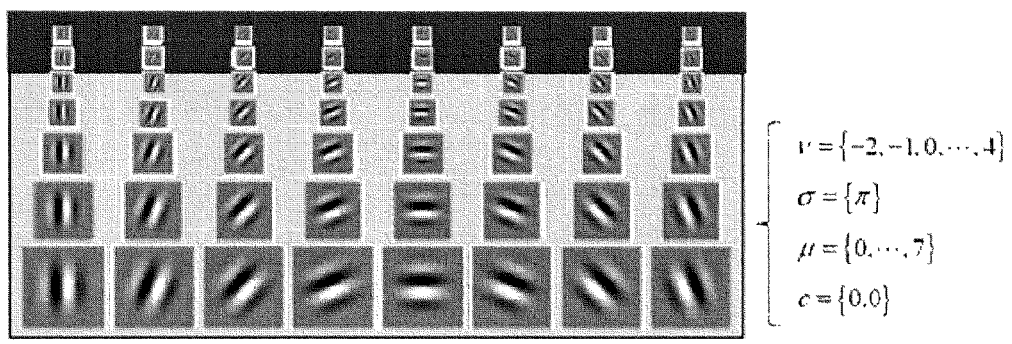
FIG. 5 illustrates exemplary curvature Gabor filters of the face recognition apparatus according to an embodiment.
Figure 5:
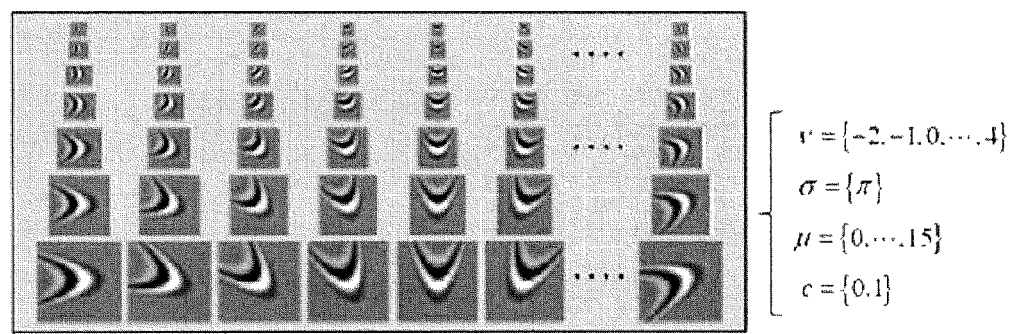

FIG. 4 illustrates an I-shaped extended curvature Gabor filter group and FIG. 5 illustrates characteristics of curvature Gabor filters.

As shown in FIG. 4(A), one I-shaped extended curvature Gabor filter group includes 12 curvature Gabor filters G={g($\sigma$1, c1), g($\sigma$2, c2), g($\sigma$3, c3), g($\sigma$4, c4), g($\sigma$5, c5), ..., g($\sigma$12, c12)} having three Gaussian widths ($\sigma$) and 4 curvature ratios (c).

As shown in FIG. 4(B), one I-shaped extended curvature Gabor filter group includes 4 curvature ratios c={0.0, 0.05, 0.1, 0.2} and one $\sigma=\{\pi\}$ of the four Gaussian widths $\sigma=\{0.5\pi, \pi, 2\pi\}$.

The 12 curvature Gabor filters have 8 orientations for the curvature ratio c={0.0} (corresponding to a line) as shown in FIG. 5(A) and have 16 orientations $\mu=\{0, 1, 2, \ldots, 15\}$ for a curvature ratio (corresponding to a curve) greater than the curvature ratio c={0.0} as shown in FIG. 5(B).

The 12 curvature Gabor filters are arranged in 4 rows representing curvature ratio c and 3 columns representing Gaussian width a as shown in FIG. 4(A) and 4 curvature Gabor filters that are I-shaped as shown in FIG. 4(B) are selected from the 12 curvature Gabor filters. Filtering is performed using the 4 I-shaped curvature Gabor filters.

The 4 I-shaped curvature Gabor filters have four curvature ratios c={0, 0.05, 0.1, 0.2} and one Gaussian width $\sigma=\{\pi\}$.

Thus, it may be possible to achieve a face recognition rate above a certain level while significantly reducing the amount of calculation and increasing recognition speed, compared to when all 12 curvature Gabor filters are used. It may also be possible to secure more reliable face recognition performance since variance is small.

Such grouping of features of curvature Gabor filters may reduce the dimensions of input values for the Linear Discriminant Analysis (LDA) process that is performed subsequent to filtering, thereby making it easy to extend curvature Gabor filters.

For example, it may be possible to reduce load upon LDA learning if the input value is reduced by grouping features of the face image even though the number of features of the face image is increased as the number of curvature Gabor filters to be used is increased by changing the Gaussian width and the curvature ratio. This may be useful in increasing LDA learning efficiency.

Each of the LDA units 142a, 142b, and 142c performs an LDA process using the I-shaped extended curvature Gabor filter group as an input value.

Here, each of the LDA units 142a, 142b, and 142c independently performs an LDA process for each I-shaped extended curvature Gabor filter group.

To accomplish this, each of the LDA units 142a, 142b, and 142c may include a plurality of LDA processing units (not shown) and may perform an LDA process of a single I-shaped extended curvature Gabor filter group through each LDA processing unit.

Accordingly, each of the LDA units 142a, 142b, and 142c outputs a plurality of LDA results (i.e., basis vectors) for a single sub-image and generates and outputs an observation node based on the output LDA results.

The classification module 140 projects features (i.e., feature vectors) of the I-shaped extended curvature Gabor filter groups of the sub-images onto basis vectors. Through such projection, the basis vectors become observation nodes.

The classification module 140 of this embodiment generates about 2400 features for one sub-image.

Here, about 2400 features are generated since the time required to output 2400 features is less than twice the time required to output 1400 features while outputting 2400 features provides better performance than outputting 1400 features and also enables relatively reliable face recognition due to small variance as has been experimentally confirmed.

Figure 6:
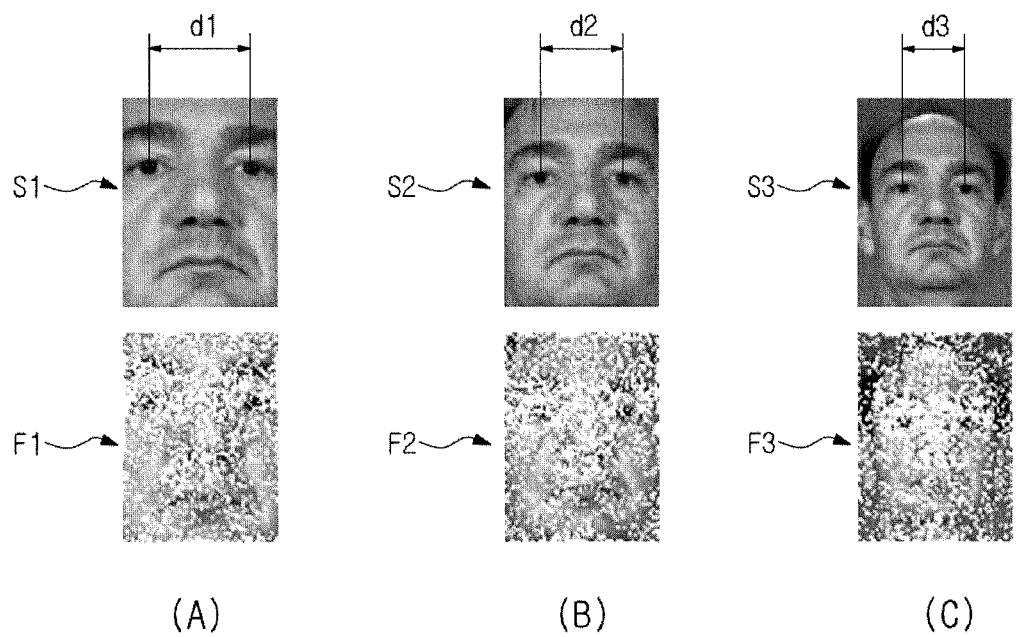
FIG. 6 illustrates exemplary feature images of the face recognition apparatus according to an embodiment.

Curvature Gabor filtering and LDA is performed on each of the sub-images S1, S2, and S3 as described above to generate a plurality of facial features as shown in FIG. 6.

More specifically, curvature Gabor filtering and LDA is performed on the sub-image S1 having an eye distance of d1 to generate a first feature image F1 as shown in FIG. 6(A), curvature Gabor filtering and LDA is performed on the sub-image S2 having an eye distance of d2 to generate a second feature image F2 as shown in FIG. 6(B), and curvature Gabor filtering and LDA is performed on the sub-image S3 having an eye distance of d3 to generate a third feature image F3 as shown in FIG. 6(C).

LDA is a learning method to enable linear projection of data onto a sub-space that maximizes between-class scatter while reducing within-class scatter.

Principal Component and Linear Discriminant Analysis (PCLDA) or Principal Component Analysis (PCA) may also be used.

The face recognizer 150 acquires observation nodes from the sub-images, compares the observation nodes with stored reference nodes of a registered person to calculate similarity (i.e., similarity scores) between the observation nodes and the reference nodes, generates state nodes (specifically, hidden state nodes) based on the similarity scores, and applies the observation nodes and the hidden state nodes to the Markov network to perform face recognition.

Based on the face recognition result, the face recognizer 150 determines whether or not the input image received through the image input unit 110 is a face image of a registered person in the registered person database 160.

The above procedure is described below with reference to FIGS. 7 to 12.

Figure 7:
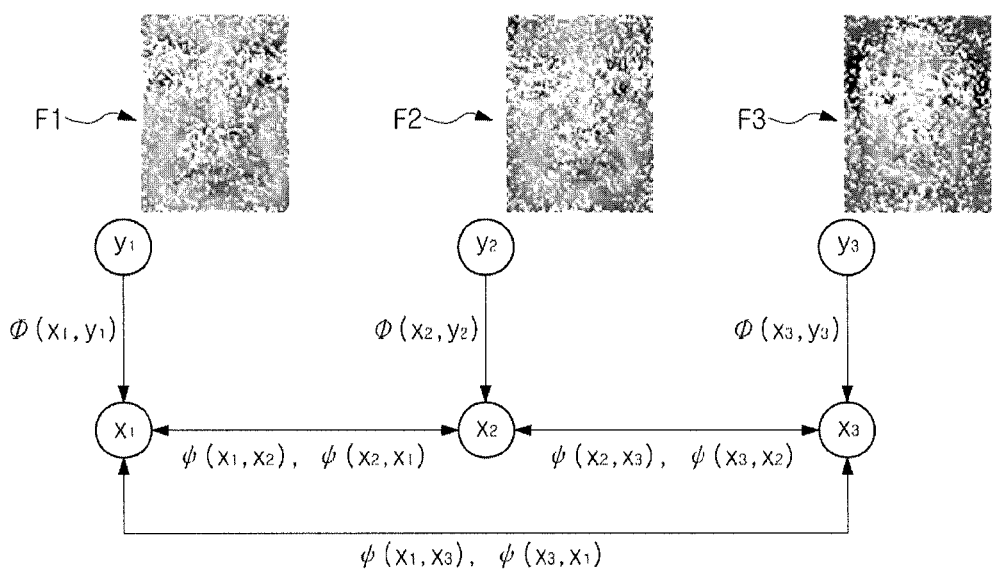
FIG. 7 illustrates a face recognition model of the face recognition apparatus according to an embodiment.

FIG. 7 illustrates a face recognition model designed by the face recognizer 150, assuming that the plurality of second face images are 3 sub-images.

As shown in FIG. 7, the face recognition model has a first observation node y1 obtained from the first feature image F1 of the first sub-image S1, a second observation node y2 obtained from the second feature image F2 of the second sub-image S2, and a third observation node y3 obtained from the third feature image F3 of the third sub-image S3.

The face recognizer 150 extracts a first reference node, a second reference node, and a third reference node of a registered face image stored in the registered person database 160, compares the first reference node with the first observation node to calculate a first similarity score, and generates a first hidden state node x1 based on the calculated first similarity score.

In addition, the face recognizer 150 compares the second reference node with the second observation node to calculate a second similarity score, and generates a second hidden state node x2 based on the calculated second similarity score and also compares the third reference node with the third observation node to calculate a third similarity score, and generates a third hidden state node x3 based on the calculated third similarity score. Here, the plurality of hidden state nodes is designed through Belief Propagation (BP) so as to enable communication between the hidden state nodes.

More specifically, when each observation node is converted into a probability model, the hidden state node probability may be expressed as follows.

$$P(X1,X2,X3|Y1,Y2,Y3)=cP(X1,X2,X3,Y1,Y2,Y3), c=1/P(Y1,Y2,Y3)$$

Here, the probability model may be represented using a compatibility matrix (Psi) representing the relationship between the state nodes (x1, x2, x3) and a vector (Pi) representing the relationship between the observation nodes (y1, y2, y3) and the state nodes (x1, x2, x3) as shown in FIG. 7. This may be expressed as follows.

$$P(X1, X2, X3, Y1, Y2, Y3) = \prod_{(i,j)} \psi(Xi, Xj) \prod_{k} \phi(Xk, Yk)$$

Probability values of the state nodes may be obtained using Maximum A posteriori (MAP) estimation.

$$\hat{X}jmap = \underset{[x_j]}{\text{argmax}} \max_{[all Xi, i \neq j]} P(X1, X2, X3, Y1, Y2, Y3)$$

Here, an iterative algorithm using belief propagation is used taking into consideration the amount of calculation.

Belief propagation iteratively calculates probability values of nodes by sequentially calculating belief and messages.

Figure 8:
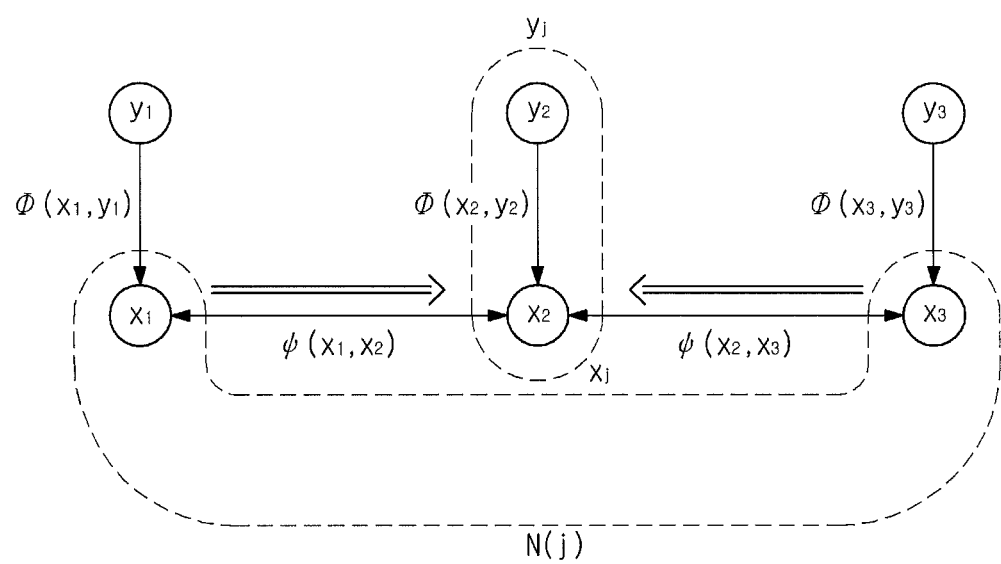
FIG. 8 illustrates an exemplary marginal distribution of the face recognition apparatus according to an embodiment.

As shown in FIG. 8, the following expresses a possible marginal distribution of the state node $x_i$ and belief.

$$b(Xj) = k\Phi(Xj, Yj) \prod_{q \in N(j)} m_{q \to j}(Xj)$$

Figure 9:
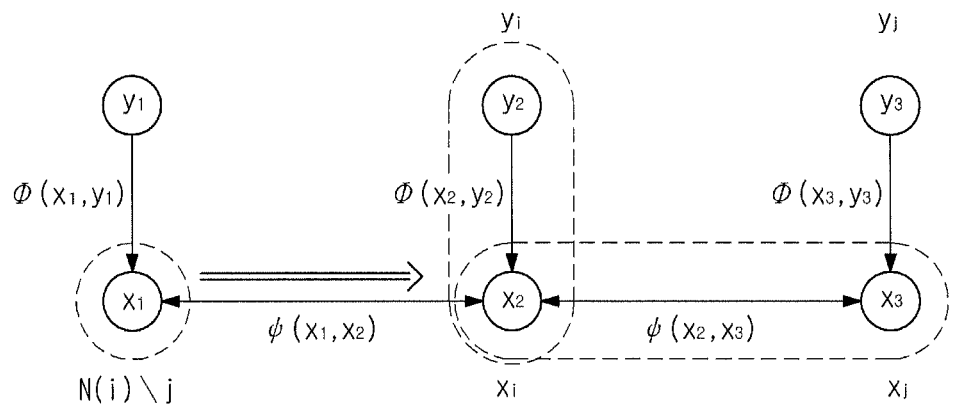
FIG. 9 illustrates an exemplary message of the face recognition apparatus according to an embodiment.

The following expresses a message communicated from a state node $x_i$ to a state node $x_{jf}$ as shown in FIG. 9.

$$m_{i \to j}(Xj) = \sum_{x^l} \Phi(Xl, Yl)\Psi(Xl, Xl) \prod_{k \in N(i) \setminus j} m_{k \to l}(Xl)$$

This message represents the influence of xi on the marginal distribution of the state node $x_{jf}$.

For face recognition, the face recognizer 150 designs an input of the Markov network as a probability model based on the method illustrated in FIGS. 7 to 9.

Figure 10:
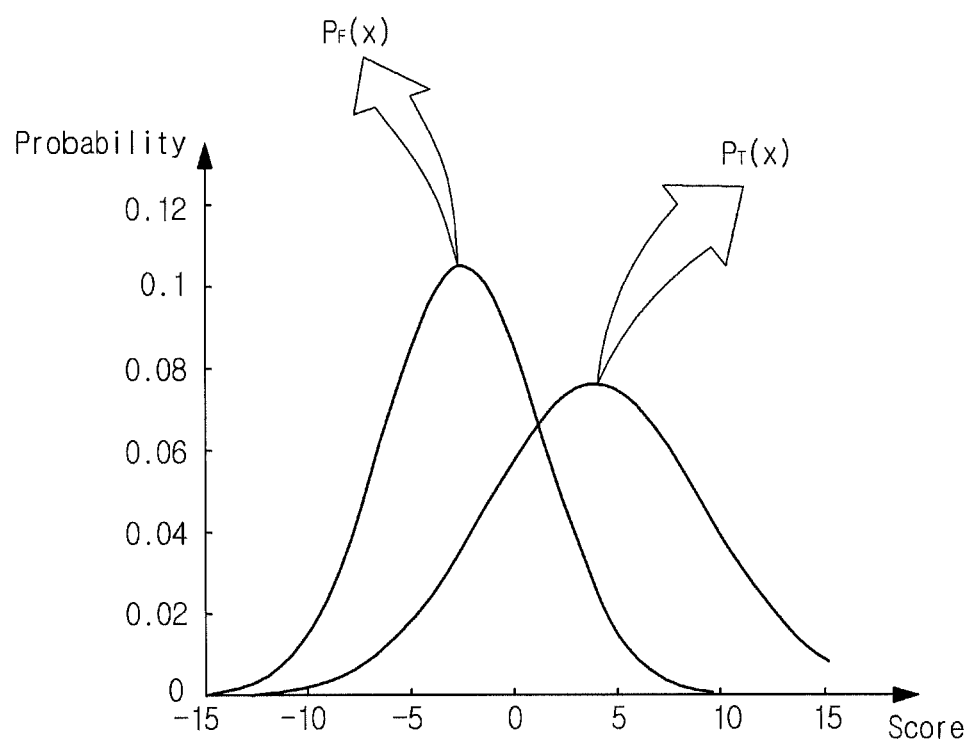
FIG. 10 illustrates an exemplary probability model of the face recognition apparatus according to an embodiment.

As shown in FIG. 10, using each of the similarity scores between the observation nodes and the reference nodes, the face recognizer 150 separately designs a probability model for the case where the similarity score is true and a probability model for the case where the similarity score is false. This may be expressed as follows.

$$P_F(x) = \frac{1}{\sqrt{2\pi\sigma_F^2}} \exp\frac{-(x-\mu_F)^2}{2\sigma_F^2}$$

$$P_T(x) = \frac{1}{\sqrt{2\pi\sigma_T^2}} \exp\frac{-(x-\mu_T)^2}{2\sigma_T^2}$$

After the face recognizer 150 designs the probability models as shown in FIG. 10 using the similarity scores obtained from the face recognition models, the face recognizer 150 designs a vector Pi and a compatibility matrix Psi in order to apply belief propagation to the Markov network.

The vector Pi and the compatibility matrix Psi used for belief propagation are designed using a cost function expressed as follows.

$$\Phi(Xi, Yi) = \begin{bmatrix} P_i(T) \\ P_i(F) \end{bmatrix}, \Psi(Xi, Xj) = \begin{bmatrix} P_{ij}(TT) & P_{ij}(TF) \\ P_{ij}(FT) & P_{ij}(FF) \end{bmatrix}$$

Here, $P_i(T)$ is a probability that a similarity score obtained from the ith face recognition model is true and $P_i(F)$ is a probability that a similarity score obtained from the ith face recognition model is false.

$P_{ij}(TT)$ is a probability that all similarity scores obtained from the ith and jth face recognition models are true, $P_{ij}(TF)$ is a probability that a similarity score obtained from the ith face recognition model is true and a similarity score obtained from the jth face recognition model is false, $P_{ij}(FT)$ is a probability that a similarity score obtained from the ith face recognition model is false and a similarity score obtained from the jth face recognition model is true, and $P_{ij}(FF)$ is a probability that all similarity scores obtained from the ith and jth face recognition models are false as expressed as follows.

$$P_{ij}(TT) = w1\{P_i(T)P_j(T)\} + w2\{\overline{P_{ij}}(TT)\}$$

$$P_{ij}(FT) = P_i(F)P_j(T)$$

$$P_{ij}(TF) = P_i(T)P_j(F)$$

$$P_{ij}(FF) = w1\{P_i(F)P_j(F)\} + w2\{\overline{P_{ij}}(FF)\}$$

Here, $\overline{P_{ij}}$ is a probability that a similarity score obtained by concatenating a state node of the ith face recognition model and a state node of the jth face recognition model is false. In each equation, $w_1$ and $w_2$ are predetermined weights.

Figure 11:
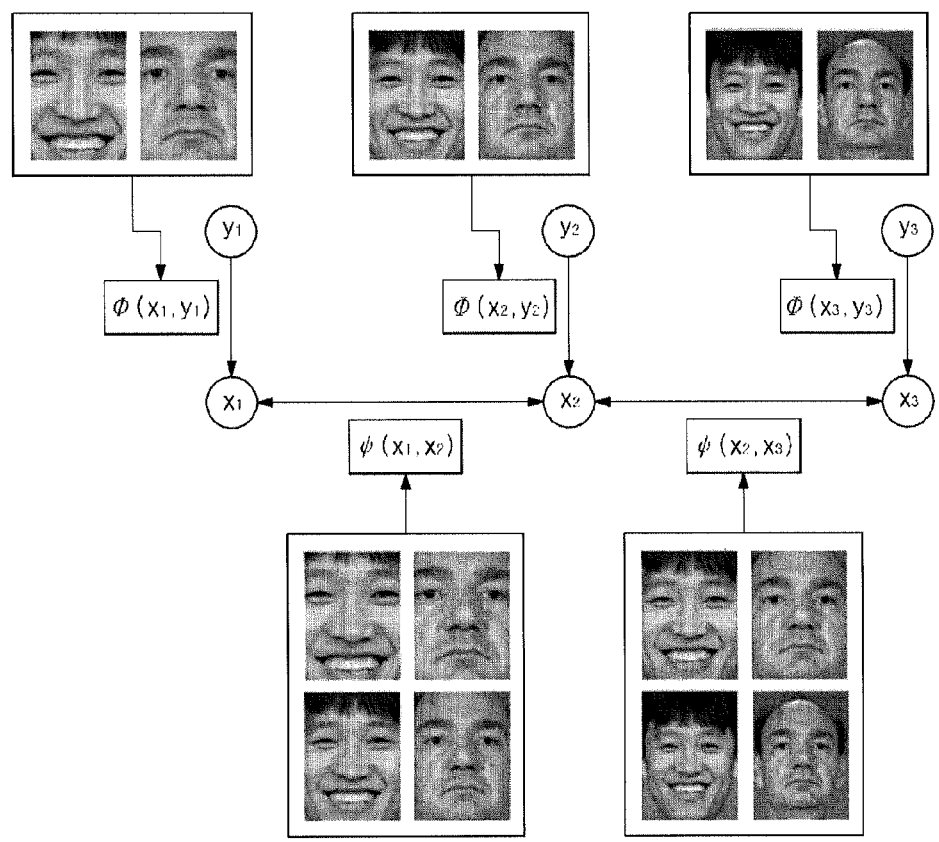
FIG. 11 illustrates an exemplary Markov network of the face recognition apparatus according to an embodiment.

FIG. 11 is a conceptual diagram illustrating use of a cost function when applying observation and state nodes to the Markov network. As shown in FIG. 11, the face recognizer 150 calculates respective probability values of the observation nodes (y1, y2, y3), calculates probability values φ (x1, y1), φ (x2, y2), and φ (x3, y3) between the observation nodes (y1, y2, y3) and the corresponding state nodes (x1, x2, x3), and calculates probability values ψ (x1, x2), ψ (x2, x3), ψ (x3, x1), ψ (x2, x1), ψ (x3, x2), and ψ (x1, x3) between the state nodes.

The face recognizer 150 compares the probability values between the observation nodes (y1, y2, y3) and the state nodes (x1, x2, x3) and compares the probability values between the state nodes and then determines whether or not the face image of the person for identity verification is a face image of a registered person.

Here, influence of each state node upon other state nodes and influence exerted upon each state node by other state nodes are all taken into consideration when the probability values between the state nodes are compared.

The registered person database 160 stores information regarding face images of persons in a group for whom identity verification is required.

The registered person database 160 stores a plurality of face image information having various facial expressions, angles, and brightness in order to improve face recognition efficiency. The plurality of face images is stored in the registered person database 160 after preprocessing is performed.

Here, preprocessing is performed to remove a background region, to adjust the size of the image with reference to the eye's positions, and then to reduce the degree of variance of illumination. The face image is stored after noise is removed therefrom through a Gaussian low pass filter.

The face images stored in the registered person database 160 may be normalized to 60*80 pixels. A plurality of sub-images generated with reference to the eye's positions may be stored in the registered person database 160 and a plurality of reference nodes of each sub-image may also be stored in the registered person database 160. Here, the reference nodes of each registered person are observation nodes of sub-images of the registered person.

The plurality of sub-images may also be generated upon face recognition.

The output unit 170 outputs the face recognition result from the face recognizer 150. That is, the output unit 170 outputs information indicating whether or not the input image received through the image input unit 110 is a face image of a registered person in the registered person database 160.

The output unit 170 may be implemented through at least one of a display unit (not shown) to display the recognition result in text and an alarm sound generator (not shown) to output sound corresponding to the recognition result.

Figure 12:
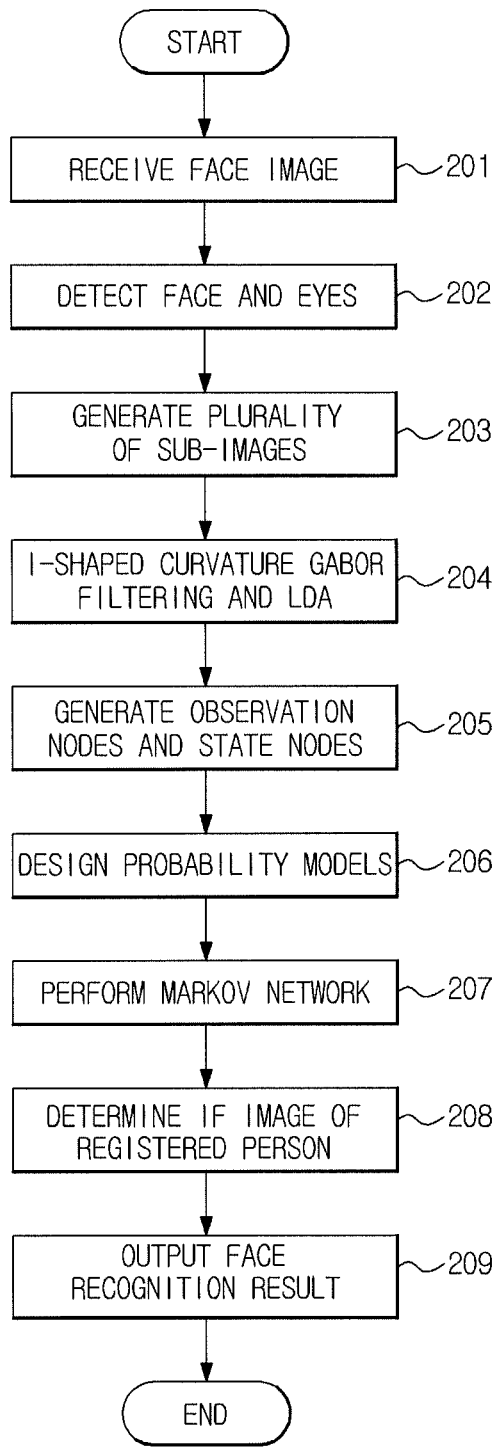
FIG. 12 is a flow chart of a face recognition method according to an embodiment.

FIG. 12 is a flow chart of a face recognition method according to an embodiment.

First, the face recognition apparatus receives an image of a person for identity verification through the image input unit 110 (201). Here, the face recognition apparatus may receive an identification (ID) of the person for identity verification to reduce identity verification time.

The image input unit 110 acquires a face image of the person for identity verification through an image capture device (not shown) such as a digital camera.

Then, the face recognition apparatus removes a background region from an input image received from the image input unit 110, detects a specific element of the face, detects a first face image M based on the specific element of the face, detects eyes in the detected face image (202), and acquires coordinates of the eyes in the first face image.

To reduce the influence of illumination, the face recognition apparatus performs preprocessing to analyze a brightness distribution of each pixel in the first face image to obtain a corresponding histogram and to smooth the histogram towards a brightness level having high frequency and also removes noise by filtering the face image using a Gaussian low pass filter.

The face recognition apparatus then calculates a distance between the eyes based on the coordinates of the eyes of the first face image M and adjusts the calculated distance between the eyes to generate a plurality of second face images which are equal in size and have different ranges for feature analysis (203).

Here, the second face images include a first sub-image S1, a second sub-image S2, and a third sub-image S3.

As shown in FIG. 2, the face image generator 130 generates a first sub-image S1 having an eye distance of d1, a second sub-image S2 having an eye distance of d2, and a third sub-image S3 having an eye distance of d3 (203).

The face recognition apparatus 100 generates a plurality of features of each of the second face images generated by the face image generator 130 by performing I-shaped curvature Gabor filtering and Linear Discriminant Analysis (LDA) on each of the second face images (204) and outputs the features of each of the sub-images.

The face recognition apparatus 100 then generates features by projecting groups of extended curvature Gabor filters (extended curvature classifier bunches) having different characteristics onto the corresponding sub-images.

As shown in FIG. 4(A), when one I-shaped extended curvature Gabor filter group includes 12 curvature Gabor filters having three Gaussian widths ($\sigma$) and 4 curvature ratios (c), the 12 curvature Gabor filters are arranged in 4 rows representing curvature ratio c and 3 columns representing Gaussian width $\sigma$ as shown in FIG. 4(A) and 4 curvature Gabor filters that are I-shaped as shown in FIG. 4(B) are selected from the 12 curvature Gabor filters. Filtering is performed using the 4 I-shaped curvature Gabor filters. The 4 I-shaped curvature Gabor filters have four curvature ratios c={0, 0.05, 0.1, 0.2} and one Gaussian width $\sigma=\{\pi\}$.

Thus, it may be possible to achieve a face recognition rate above a certain level while significantly reducing the amount of calculation and increasing recognition speed, compared to when all 12 curvature Gabor filters are used. It may also be possible to secure more reliable face recognition performance since variance is small.

The face recognition apparatus performs an LDA process on the I-shaped extended curvature Gabor filter group.

Accordingly, the face recognition apparatus outputs a plurality of LDA results (i.e., basis vectors) for a single sub-image and generates an observation node based on the output LDA results.

Specifically, the face recognition apparatus projects features (i.e., feature vectors) of the I-shaped extended curvature Gabor filter groups of the sub-images S1, S2, and S3 onto basis vectors. Through such projection, the basis vectors become observation nodes. Thus, feature images F1, F2, and F3 including the observation nodes are generated.

The face recognition apparatus 100 acquires observation nodes (y1, y2, y3) from the sub-images (S1, S2, S3), compares the observation nodes (y1, y2, y3) with stored reference nodes of a registered person to calculate similarity (i.e., similarity scores) between the observation nodes and the reference nodes, generates state nodes (specifically, hidden state nodes) (x1, x2, x3) based on the similarity scores (205), and applies the observation nodes (y1, y2, y3) and the state nodes (x1, x2, x3) to the Markov network to perform face recognition.

More specifically, the face recognition apparatus performs face recognition modeling using a first observation node y1 obtained from the first feature image F1 of the first sub-image S1, a second observation node y2 obtained from the second feature image F2 of the second sub-image S2, a third observation node y3 obtained from the third feature image F3 of the third sub-image S3, a first state node x1 corresponding to the first observation node y1, a second state node x2 corresponding to the second observation node y2, and a third state node x3 corresponding to the third observation node y3.

The face recognition apparatus then designs a probability model based on the Markov network (206). Here, the plurality of hidden state nodes is designed through Belief Propagation (BP) so as to enable communication between the hidden state nodes.

Specifically, as shown in FIG. 10, using each of the similarity scores between the observation nodes and the reference nodes, the face recognition apparatus separately designs a probability model for the case where the similarity score is true and a probability model for the case where the similarity score is false (206).

The face recognition apparatus then designs a vector Pi and a compatibility matrix Psi in order to apply belief propagation to the Markov network.

Here, the vector Pi represents the relationship between observation nodes and the state nodes and the compatibility matrix Psi represents the relationship between the state nodes.

Specifically, the vector Pi and the compatibility matrix Psi used for belief propagation are designed using a cost function.

Then, the face recognition apparatus performs a Markov network on each node to repeatedly calculate a probability value (207).

Specifically, the face recognition apparatus calculates respective probability values of the observation nodes (y1, y2, y3), calculates probability values $\phi$ (x1, y1), $\phi$ (x2, y2), and $\phi$ (x3, y3) between the observation nodes (y1, y2, y3) and the corresponding state nodes (x1, x2, x3), and calculates probability values $\psi$ (x1, x2), $\psi$ (x2, x3), $\psi$ (x3, x1), $\psi$ (x2, x1), $\psi$ (x3, x2), and $\psi$ (x1, x3) between the state nodes.

The face recognition apparatus then compares the probability values between the observation nodes (y1, y2, y3) and the state nodes (x1, x2, x3) and compares the probability values between the state nodes and then determines whether or not the face image of the person for identity verification is a face image of a registered person (208).

Here, influence of each state node upon other state nodes and influence exerted upon each state node by other state nodes are all taken into consideration when the probability values between the state nodes are compared.

The face recognition apparatus then outputs the face recognition result (209). That is, the face recognition apparatus determines whether or not the input image for identity verification is a face image of a registered person in the registered person database 160 and outputs the determined result.

This method may improve face recognition performance and face recognition speed.

As is apparent from the above description, a face recognition apparatus and method according to embodiments may improve face recognition performance by performing face recognition using the Markov network.

In addition, it may be possible to achieve face recognition performance robust to facial expression variation or type information by performing I-shaped curvature Gabor filtering on a plurality of sub-images generated based on the distance between the two eyes.

Further, it may be possible to improve recognition rate for relatively small images by extending the number of curvature Gabor filters having curvature ratios and it may also be possible to reduce the amount of calculation required for face recognition since optimal features are selectively extracted using a boosting algorithm.

Furthermore, it may be possible to significantly reduce storage space, feature values, and time required to extract or compare facial features. It may also be possible to implement a face recognition system that operates well even with low hardware specifications.

The embodiments can be implemented in computing hardware and/or software, such as (in a non-limiting example) any computer that can store, retrieve, process and/or output data and/or communicate with other computers. For example, image input unit 110, face detector 120, face image generator 130, classification module 140, face recognizer 150, registered person database 160 and/or output unit 170 in FIG. 1 may include a computer to perform operations and/or calculations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A face recognition apparatus comprising:
   an image input unit to receive a face image of an identity verification subject;
   a face image generator to generate sub-images having different face sizes using the face image;
   a classification module to generate respective feature vectors of the sub-images by performing I-shaped curvature Gabor filtering on the sub-images, and to generate observation nodes based on the feature vectors; and
   a face recognizer to compare the observation nodes with stored reference nodes of sub-images of a registered person on a face size by face size basis to calculate respective similarity scores between the observation nodes and the reference nodes, generate respective state nodes based on the respective similarity scores, compare the observation nodes and the state nodes, and compare the state nodes to thereby perform face recognition.

2. The face recognition apparatus according to claim 1, wherein the face recognizer performs a Markov network on the observation nodes and the state nodes.

3. The face recognition apparatus according to claim 2, wherein, using each of the similarity scores and the reference nodes, the face recognizer separately designs a probability model for a case where the similarity score is true and a probability model for a case where the similarity score is false.

4. The face recognition apparatus according to claim 3, wherein each of the state nodes is designed using belief propagation.

5. The face recognition apparatus according to claim 4, wherein the face recognizer designs a vector and a compatibility matrix for the belief propagation and applies the designed vector and compatibility matrix to the Markov network.

6. The face recognition apparatus according to claim 5, wherein the face recognizer calculates a probability value corresponding to the vector and a probability value corresponding to the compatibility matrix using the probability models, compares the probability value corresponding to the vector and the probability value corresponding to the compatibility matrix, and compares probability values between compatibility matrices to determine whether or not the identity verification subject is a registered person.

7. The face recognition apparatus according to claim 1, wherein the classification module generates the observation nodes by performing linear discriminant analysis on the feature vectors.

8. The face recognition apparatus according to claim 1, wherein the face image generator detects a face and two eyes from the face image, detects a distance between the two eyes, and generates the sub-images by adjusting the detected distance.

9. A face recognition method comprising:
   generating, upon receiving a face image of an identity verification subject and using a computer, sub-images having different face sizes using the face image;
   generating, using a computer, respective feature vectors of the sub-images by performing I-shaped curvature Gabor filtering on the sub-images, and generating observation nodes based on the feature vectors;
   comparing, using a computer, the observation nodes with stored reference nodes of sub-images of a registered person on a face size by face size basis to calculate respective similarity scores between the observation nodes and the reference nodes;
   generating, using a computer, respective state nodes based on the respective similarity scores; and
   comparing, using a computer, the observation nodes and the state nodes and comparing the state nodes, to thereby perform face recognition.

10. The face recognition method according to claim 9, further comprising:
    performing a Markov network on the observation nodes and the state nodes, to thereby perform the face recognition.

11. The face recognition method according to claim 10, further comprising:
    separately designing, using each of the similarity scores and the reference nodes, a probability model for a case where the similarity score is true and a probability model for a case where the similarity score is false.

12. The face recognition method according to claim 11, wherein said separately designing comprises designing each of the state nodes and the observation nodes using belief propagation.

13. The face recognition method according to claim 12, wherein said separately designing comprises:
    designing a vector and a compatibility matrix for the belief propagation; and
    applying the designed vector and compatibility matrix to the Markov network.

14. The face recognition method according to claim 13, further comprising:
    calculating a probability value corresponding to the vector and a probability value corresponding to the compatibility matrix using the probability models;

comparing the probability value corresponding to the vector and the probability value corresponding to the compatibility matrix; and comparing probability values between compatibility matrices to determine whether or not the identity verification subject is a registered person, to thereby perform the face recognition.

15. The face recognition method according to claim 9, wherein:

said generating observation nodes comprises generating the observation nodes by performing linear discriminant analysis on the feature vectors.

16. The face recognition method according to claim 9, wherein said generating the sub-images comprises:

detecting a face and two eyes from the face image; and detecting a distance between the two eyes and generating the sub-images by adjusting the detected distance.

17. A method comprising:

generating, using a computer, sub-images having different face sizes from a face image of an identity verification subject;

generating, using a computer, feature vectors of the sub-images by performing I-shaped curvature Gabor filtering on the sub-images;

generating, using a computer, observation nodes based on the feature vectors;

comparing, using a computer, the observation nodes with stored reference nodes of a registered subject to thereby calculate similarity scores between the observation nodes and the reference nodes;

generating, using a computer, state nodes based on the similarity scores; and applying, using a computer, the observation nodes and the state nodes to a Markov network, to thereby perform face recognition of the identify verification subject.

18. The face recognition apparatus according to claim 1, wherein the face image has two eyes, each of the sub-images has two eyes, and each respective sub-image is generated by the face image generator to have a different distance between the two eyes of the respective sub-image than the distance between the two eyes of each of the other sub-images.

19. The face recognition apparatus according to claim 1, wherein the face image generator generates the sub-images having different face sizes to thereby provide sub-images ranging from a respective sub-image that is an image of an interior face model of the face image to a respective sub-image that is an image of an exterior face model of the face image.

\* \* \* \* \*